United States Patent
Kim et al.

(10) Patent No.: US 8,564,889 B2
(45) Date of Patent: Oct. 22, 2013

(54) ZOOM LENS AND PHOTOGRAPHING DEVICE HAVING THE SAME

(75) Inventors: Dong-woo Kim, Suwon-si (KR); Jung-hyun Lee, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 13/420,842

(22) Filed: Mar. 15, 2012

(65) Prior Publication Data

US 2013/0027786 A1    Jan. 31, 2013

(30) Foreign Application Priority Data

Jul. 28, 2011    (KR) .................. 10-2011-0075214

(51) Int. Cl.
*G02B 15/14*    (2006.01)
(52) U.S. Cl.
USPC .......................................... 359/690; 359/683
(58) Field of Classification Search
USPC .................................................. 359/683, 690
See application file for complete search history.

(56) References Cited

U.S. PATENT DOCUMENTS

| | | | | |
|---|---|---|---|---|
| 4,449,791 | A * | 5/1984 | Terasawa et al. | 359/690 |
| 7,336,429 | B2 * | 2/2008 | Shibayama | 359/690 |
| 2009/0284642 | A1 | 11/2009 | Ichikawa | |
| 2010/0085648 | A1 | 4/2010 | Masugi | |
| 2010/0091381 | A1 | 4/2010 | Katakura | |
| 2010/0123959 | A1 | 5/2010 | Kuroda et al. | |

FOREIGN PATENT DOCUMENTS

| | | |
|---|---|---|
| JP | 2004-318097 A | 11/2004 |
| JP | 2006-139187 A | 6/2006 |
| JP | 2009-276622 A | 11/2009 |
| JP | 2010-072051 A | 4/2010 |
| JP | 2010-085875 A | 4/2010 |
| JP | 2010-122457 A | 6/2010 |
| JP | 2010-134373 A | 6/2010 |

OTHER PUBLICATIONS

Search Report established for EP 12160416.9 (May 2, 2012).

* cited by examiner

*Primary Examiner* — Scott J Sugarman
(74) *Attorney, Agent, or Firm* — Drinker Biddle & Reath LLP (57) ABSTRACT

A zoom lens and a photographing device including the zoom lens. The zoom lens includes: a first lens group having a negative refractive power; a second lens group having a positive refractive power; and a third lens group having a positive refractive power, which are sequentially arranged in a direction from an object side to an image side, wherein the first lens group comprises a first lens that is biconcave and is closest to the object side. Accordingly, a compact and low-priced zoom lens having a high magnification may be manufactured.

18 Claims, 10 Drawing Sheets

FIG. 1

(WIDE ANGLE POSITION)

(MIDDLE POSITION)

(TELEPHOTO POSITION)

(WIDE ANGLE POSITION)

(MIDDLE POSITION)

(TELEPHOTO POSITION)

ZOOM LENS AND PHOTOGRAPHING DEVICE HAVING THE SAME

CROSS-REFERENCE TO RELATED PATENT APPLICATION

This application claims the priority benefit of Korean Patent Application No. 10-2011-0075214, filed on Jul. 28, 2011, in the Korean Intellectual Property Office, the entirety of which is incorporated herein by reference.

BACKGROUND

1. Field

Embodiments of the invention relate to a small and low-priced zoom lens having a high zoom magnification, and a photographing device including the zoom lens.

2. Description of the Related Art

Recently, a small optical system having high magnification is required as a zoom lens for use in photographing devices such as digital cameras or digital camcorders that include image pickup devices, such as charge coupled devices (CCDs) or complementary metal-oxide semiconductors (CMOSs). Achievement of high magnification hinders miniaturization, and miniaturization due to the use of a highly refractive aspherical lens increases the manufacturing costs of a zoom lens. As such, it is difficult to achieve miniaturization, high optical performance, and low manufacturing costs at the same time.

SUMMARY

Embodiments include a small and low-priced zoom lens having a high zoom magnification, and a photographing device including the zoom lens.

According to an embodiment, there is provided a zoom lens comprising: a first lens group having a negative refractive power; a second lens group having a positive refractive power; and a third lens group having a positive refractive power, which are sequentially arranged in a direction from an object side to an image side, wherein during zooming from a wide angle position to a telephoto position, the interval between the first lens group and the second lens group decreases, and the interval between the second lens group and the third lens group increases, the first lens group comprises a first lens, which is biconcave and is closest to the object side, and satisfies the following expressions:

$$4 \leq \frac{ft}{fw} \leq 7$$

$$\frac{G_1}{fw} \leq 0.8$$

where fw and ft denote the focal length of the zoom lens at the wide angle position and the focal length of the zoom lens at the telephoto position, respectively, and $G_1$ denotes the distance between a vertex at the object side and a vertex at the image side along an optical axis in the first lens group.

The first lens group may further comprise a second lens at the image side of the first lens and satisfies the following expression:

$$\frac{|R_{1-2} - R_{2-1}|}{fw} \leq 0.3$$

where $R_{1-2}$ denotes the radius of curvature of the surface of the first lens of the first lens group that faces the image side, and $R_{2-1}$ denotes the radius of curvature of the surface of the second lens of the first lens group that faces the object side, and fw denotes the focal length of the zoom lens at the wide angle position.

The first lens group may further comprise a second lens at the image side of the first lens and satisfies the following expression:

$$1.9 \leq N_2 \leq 2.2$$

where $N_2$ denotes the refractive index of the second lens of the first lens group.

The first lens may be a spherical lens.

The first lens may be a spherical lens, and the first lens group may further comprise a second lens that is a spherical lens, at the image side of the first lens.

The second lens may be a meniscus lens that is convex toward the object side.

The first lens may have a refractive index of 1.8 or greater and an Abbe's number of 34 or greater.

The second lens group may comprise an aspheircal lens that is closest to the object side.

The second lens group may comprise one doublet lens.

The doublet lens may comprise a positive lens and a negative lens.

The third lens group may comprise a meniscus lens that is convex toward the image side.

The meniscus lens may be an aspherical lens.

The meniscus lens may be formed of plastic.

An aperture stop may be formed at the object side of the second lens group.

The stop may move together with the second lens group during zooming.

The third lens group may perform focusing.

The zoom lens may correct distortion using software.

According to another embodiment, there is provided a photographing device comprising: a zoom lens; and an imaging device for converting an image obtained by using the zoom lens into an electrical image signal, wherein the zoom lens comprises: a first lens group having a negative refractive power; a second lens group having a positive refractive power; and a third lens group having a positive refractive power, which are sequentially arranged in a direction from an object side to an image side, wherein during zooming from a wide angle position to a telephoto position, an interval between the first lens group and the second lens group decreases, and an interval between the second lens group and the third lens group increases, the first lens group comprises a first lens, which is biconcave and is closest to the object side, and satisfies the following expressions:

$$4 \leq \frac{ft}{fw} \leq 7,$$

$$\frac{G_1}{fw} \leq 0.8$$

where fw and ft denote the focal length of the zoom lens at the wide angle position and the focal length of the zoom lens at the telephoto position, respectively, and $G_1$ denotes the distance between a vertex at the object side and a vertex at the image side along an optical axis in the first lens group.

BRIEF DESCRIPTION OF THE DRAWINGS

The above and other features and advantages will become more apparent by describing in detail exemplary embodiments thereof with reference to the attached drawings in which.

DETAILED DESCRIPTION

Zoom lenses and photographing devices including the same according to various embodiments will now be described in detail with reference to the accompanying drawings.

Figure 1:
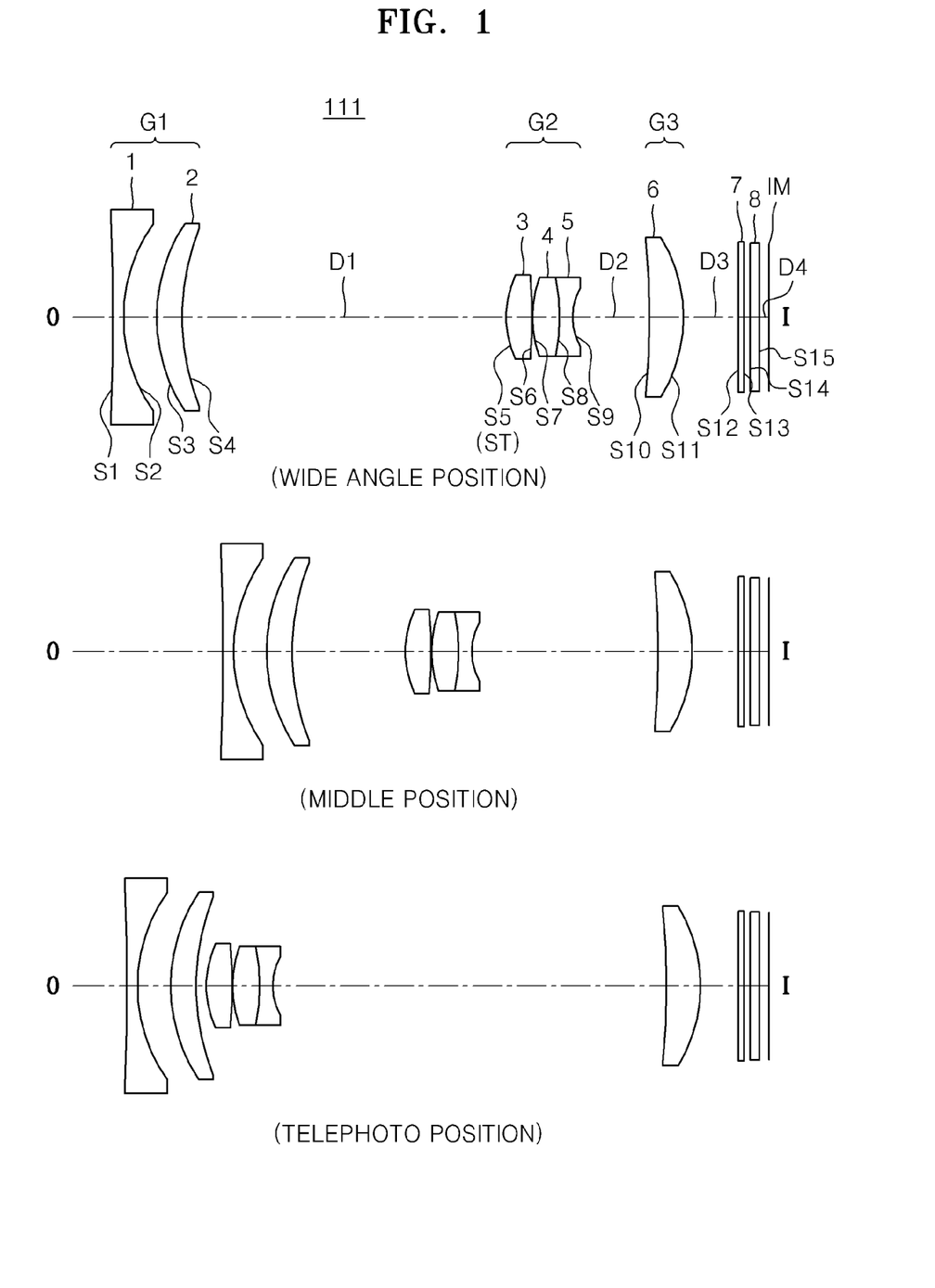
FIG. 1 illustrates optical arrangements of a zoom lens at a wide angle position, at a middle position, and at a telephoto position, according to an embodiment of the invention.

Referring to FIG. 1, the zoom lens 111 may include a first lens group G1 having a negative refractive power, a second lens group G2 having a positive refractive power, and a third lens group G3 having a positive refractive power. When zooming is performed from a wide angle position to a telephoto position, the interval between the first and second lens groups G1 and G2 may decrease and the interval between the second and third lens groups G2 and G3 may increase. The third lens group G3 may perform focusing by performing image plane movement and focus location correction during zooming.

The first lens group G1 may include a first lens 1. The first lens 1 may be a biconcave lens. Also, the first lens 1 may be a spherical lens. The first lens 1 is closest to an object side O and has a greater outer diameter than the other lenses of the zoom lens 111. The first lens 1 having a large outer diameter and being a spherical lens may reduce the manufacturing costs of the zoom lens 111. Also, by including the first lens 1 which is a biconcave lens, distortion and astigmatism which may increase due to not using an aspherical lens in the first lens group G1 may be corrected. The first lens 1 may be formed of, for example, a material having a refractive index of 1.8 or greater and an Abbe's number of 34 or greater.

A second lens 2 may be further included at the image side I of the first lens 1. The second lens 2 may be, for example, a meniscus lens. The meniscus lens may be convex toward the object side O. A compact zoom lens may be manufactured by forming the first lens group using two lenses—a biconcave lens and a meniscus lens. The second lens 2 may be a spherical lens. By forming the first lens 1 and the second lens 2 using spherical lenses, the manufacturing costs may be reduced. Meanwhile, in the zoom lens 111 according to an embodiment of the invention, distortion and chromatic aberration may be corrected using software. For example, distortion and chromatic aberration which are not corrected using lenses when the first and second lenses 1 and 2 are formed using spherical lenses may be corrected using software.

The second lens group G2 may include a third lens 3 which is an aspherical lens closest to the object side O. The third lens 3 may be a convex lens. As the third lens 3 is formed of an aspherical lens, spherical aberration at the wide angle position and the telephoto position may be corrected. A fourth lens 4 and a fifth lens 5 may be disposed next to the third lens 3. The fourth lens 4 and the fifth lens 5 may be doublet lenses. For example, the doublet lenses may each include a positive lens and a negative lens to reduce lateral chromatic aberration occurring during zooming. Also, as the second lens group G2 includes a doublet lens, the total thickness of the second lens group G2 may be minimized. An aperture stop ST may be included in the second lens group G2 so as to be closest to the object side O. The stop ST may be disposed, for example, at the object side O of the third lens 3. The stop ST may move together with the second lens group G2 during zooming. The stop ST may be configured as a fixed stop which does not change in size during zooming. For example, the stop ST may be designed such that an F number Fno increases to about 6.5 at the telephoto position, and Fno decreases to about 2.6 at the wide angle position.

The third lens group G3 may include a sixth lens 6. The sixth lens 6 may be a convex meniscus lens that is convex toward the image side I. Also, the sixth lens 6 may be an aspherical lens. The sixth lens 6 may be formed of plastic, thereby reducing the manufacturing costs. For example, by forming the sixth lens 6 using an aspherical plastic lens having a refractive index of 1.55 or smaller, a variation in peripheral curvature aberration according to a variation in object distance may be controlled to be minimum while controlling an angle of light incident on an image plane IM not to increase.

A zoom lens according to an embodiment of the invention may have a zoom magnification as shown by Expression 1 below:

$$4 \le \frac{ft}{fw} \le 7 \qquad \text{[Expression 1]}$$

where fw and ft denote the focal length of the zoom lens 111 at the wide angle position and the focal length of the zoom lens 111 at the telephoto position, respectively. The zoom magnification of Expression 1 is obtained by dividing the focal length of the zoom lens 111 at the telephoto position by the focal length of the zoom lens 111 at the wide angle position. A zoom lens having a negative lens, a positive lens, and another positive lens may secure a zoom magnification of 4× or greater. However, when the zoom magnification exceeds an upper limit of 7, chromatic aberration at the telephoto position makes it difficult to secure optical performance, and the amount of movement of each lens group is greatly increased during zooming, thus making it difficult to form a small lens barrel.

The first lens group G1 may also be manufactured to satisfy Expression 2 below:

$$\frac{G_1}{fw} \leq 0.8 \qquad \text{[Expression 2]}$$

where $G_1$ denotes the distance between a vertex at the object side O and a vertex at the image side I along an optical axis in the first lens group G1. Expression 2 denotes a ratio of a focal length at the wide angle position with respect to the distance between the vertex at the object side O and the vertex at the image side I along the optical axis in the first lens group G1. If $G_1/f_w$ is beyond the range of Expression 2, the thickness of the first lens group G1 with respect to the focal length increases, and this makes it difficult to form a compact zoom lens. By satisfying Expression 2, a small distance may be set between the vertex at the object side O and the vertex at the image side I along the optical axis in the first lens group G1, thereby manufacturing a compact zoom lens.

The first lens 1 and the second lens 2 of the first lens group G1 may be manufactured to satisfy Expression 3 below:

$$\frac{|R_{1-2} - R_{2-1}|}{fw} \leq 0.3 \qquad \text{[Expression 3]}$$

where $R_{1-2}$ denotes the radius of curvature of the surface of the first lens 1 of the first lens group G1 that faces the image side I, and $R_{2-1}$ denotes the radius of curvature of the surface of the second lens 2 of the first lens group G1 that faces the object side O, and fw denotes the focal length of the zoom lens 111 at the wide angle position.

Expression 3 denotes a ratio of the focal length with respect to the difference between the radius of curvature of the first lens 1 at the image side I and the radius of curvature of the second lens 2 at the object side O in the first lens group G1. By satisfying Expression 3, intervals between lenses in the first lens group G may be minimized, and accordingly, a compact zoom lens may be manufactured.

$$1.9 \leq N_2 \leq 2.2 \qquad \text{[Expression 4]}$$

where $N_2$ denotes the refractive index of the second lens 2 of the first lens group G1. The refractive index may be, for example, a refractive index at d-line (587.56 nm). By using the second lens 2 that satisfies Expression 4, a compact zoom lens may be manufactured and chromatic aberration may be corrected.

The first lens 1 of the first lens group G1 may be formed of, for example, a material having a refractive index of 1.8 or greater and an Abbe's number of 34 or greater. Also, the second lens 2 may be formed of, for example, a material having a refractive index of 1.9 to 2.2 and an Abbe's number of 19 or less so as to facilitate correction of chromatic aberration at the telephoto position. Also, by forming the first lens group G1 using a highly refractive material, the distance each lens group moves during zooming from the wide angle position to the telephoto position may be minimized, and a structurally more compact barrel may be manufactured.

The term "aspherical" described in the embodiments of the invention is defined as follows.

The aspherical shape of a zoom lens according to an embodiment of the invention may be expressed as in Expression 5, by making an optical axis direction an axis x and a direction perpendicular to the direction of the optical axis direction an axis y, where x denotes the distance from a vertex of a lens along the optical axis direction, y denotes the distance from the vertex of the lens in a direction perpendicular to the optical axis, K denotes a conic constant, A, B, C, and D denote aspherical coefficients, and c denotes a reciprocal (1/R) of the radius of curvature of the vertex of the lens.

$$x = \frac{cy^2}{1 + \sqrt{1 - (K+1)c^2 y^2}} + Ay^4 + By^6 + Cy^8 + Dy^{10} \qquad \text{[Expression 5]}$$

Miniaturization and price lowering of a zoom lens can be achieved via the following embodiments based on various designs.

In the following lens data, f denotes the focal length of the zoom lens, Fno denotes the F number, 2ω denotes a viewing angle, R denotes the radius of curvature, Dn denotes the thickness of the center of a lens or an interval between lenses, Nd denotes a refractive index, and Vd denotes the Abbe's number. ST denotes an aperture stop, D1, D2, D3, and D4 denote variable distances between lenses, and ASP denotes an aspherical surface. In the following embodiments, like lenses included in each lens group are indicated by like reference characters. In each embodiment, the unit of a distance is mm. Reference numerals 8 and 9 may indicate filters or cover glass.

<Embodiment 1>

FIG. 1 illustrates optical arrangements of a zoom lens at a wide angle position, at a middle position, and at a telephoto position, according to Embodiment 1.

f; 4.85~10.65~22.93 Fno; 2.69~3.96~6.57 2ω; 77.26~39.98~19.18

| | R | Dn | Nd | Vd |
|---|---|---|---|---|
| OBJ: | INFINITY | INFINITY | | |
| S1: | −114.85885 | 0.500000 | 1.883000 | 40.8054 |
| S2: | 8.49754 | 1.786225 | | |
| S3: | 9.40801 | 1.411097 | 1.945945 | 17.9843 |
| S4: | 13.90218 | D1 | | |
| SR(ST): | 5.59116 | 1.392546 | 1.606020 | 57.4000 |
| ASP: | | | | |

K: −0.280658
A: 0.132724E−03 B: 0.104219E−04 C: −0.207302E−05
D: −0.163953E−06

| S6: | −41.65499 | 0.100000 | | |
|---|---|---|---|---|
| ASP: | | | | |

K: 0.000000
A: 0.452581E−03 B: −0.973734E−05 C: 0.000000E+00
D: 0.000000E+00

| S7: | 8.41967 | 1.400669 | 1.883000 | 40.8054 |
|---|---|---|---|---|
| S8: | −7.76995 | 0.648127 | 1.698950 | 30.0505 |
| S9: | 3.43814 | D2 | | |
| S10: | −33.63558 | 1.761336 | 1.531200 | 56.5100 |
| ASP: | | | | |

K: 0.000000
A: −0.849433E−04 B: 0.827199E−05 C: −0.773515E−06
D: 0.251769E−07

| S11: | −7.32618 | D3 | | |
|---|---|---|---|---|
| ASP: | | | | |

K: 0.000000
A: 0.538997E−03 B: −0.184713E−04 C: 0.228526E−06
D: 0.380820E−08

| S12: | INFINITY | 0.300000 | 1.516798 | 64.1983 |
|---|---|---|---|---|
| S13: | INFINITY | 0.300000 | | |

-continued

|      | R        | Dn       | Nd       | Vd      |
|------|----------|----------|----------|---------|
| S14: | INFINITY | 0.500000 | 1.516798 | 64.1983 |
| S15: | INFINITY | 0.535770 |          |         |
| IM:  | INFINITY |          |          |         |

Data about the variable distances during zooming is as follows.

TABLE 1

| Variable distance | Wide angle position | Middle position | Telephoto position |
|---|---|---|---|
| D1 | 17.216 | 5.911 | 0.61 |
| D2 | 4.1504 | 10.0511 | 21.0415 |
| D3 | 2.9845 | 2.4108 | 1.90 |

Figure 2A:
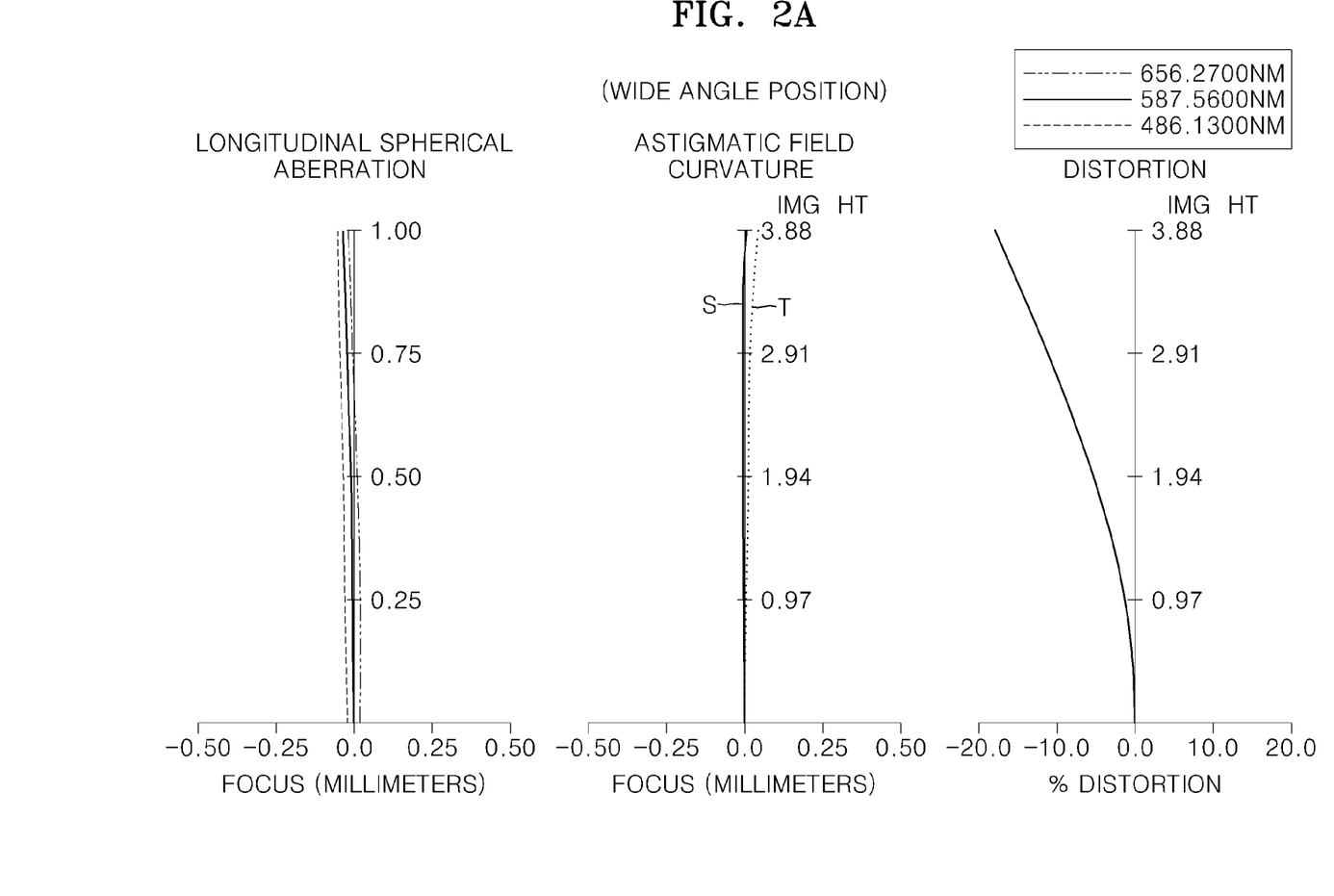
FIGS. 2A and 2B illustrate longitudinal spherical aberration, astigmatic field curvature, and distortion of the zoom lens illustrated in FIG. 1, at a wide angle position and at a telephoto position, respectively.
Figure 2B:
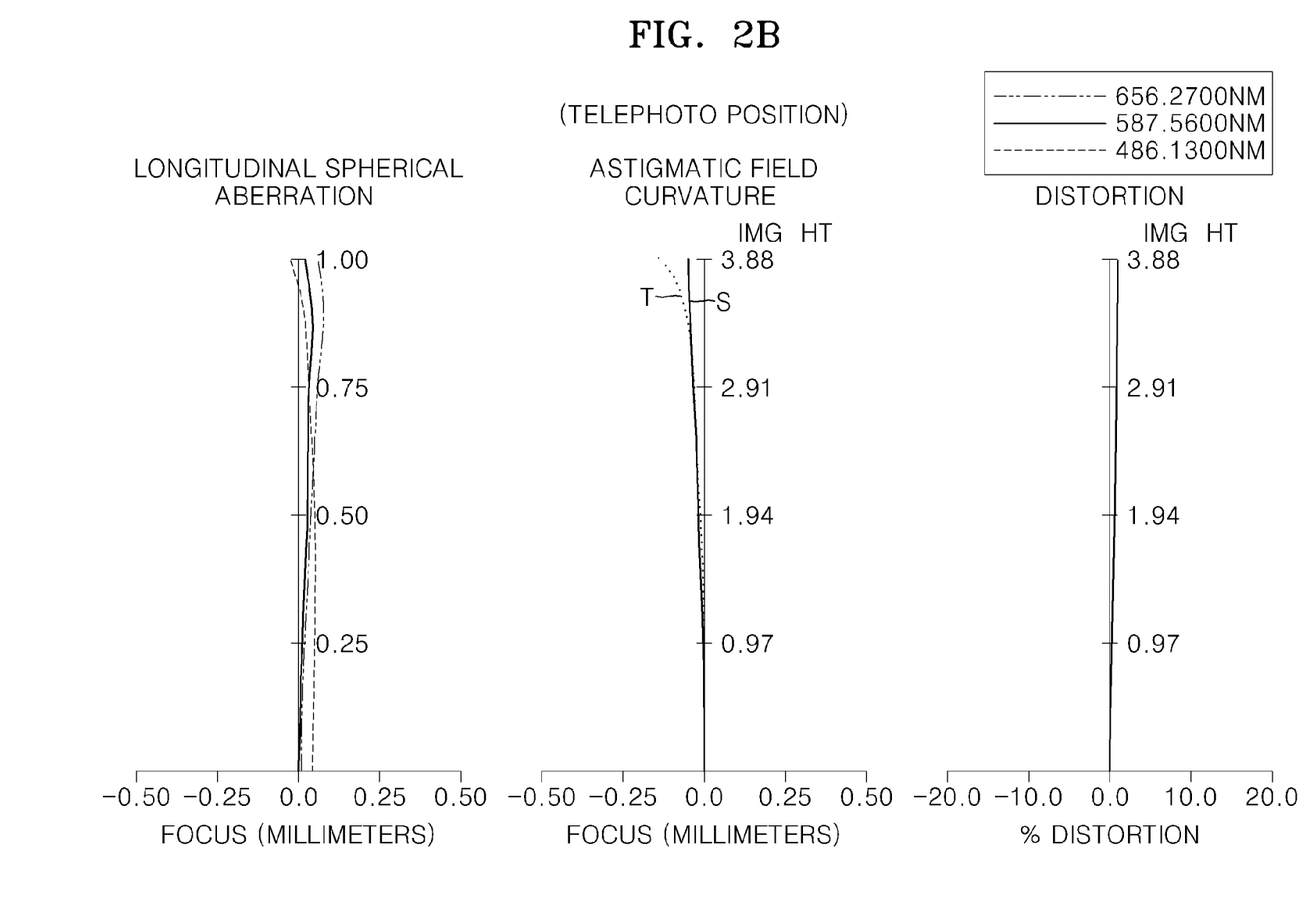

FIGS. 2A and 2B illustrate longitudinal spherical aberration, astigmatic field curvature, and distortion of the zoom lens according to Embodiment 1, at a wide angle position and at a telephoto position, respectively. Astigmatic field curvature includes a tangential field curvature T and a sagittal field curvature S.

<Embodiment 2>

Figure 3:
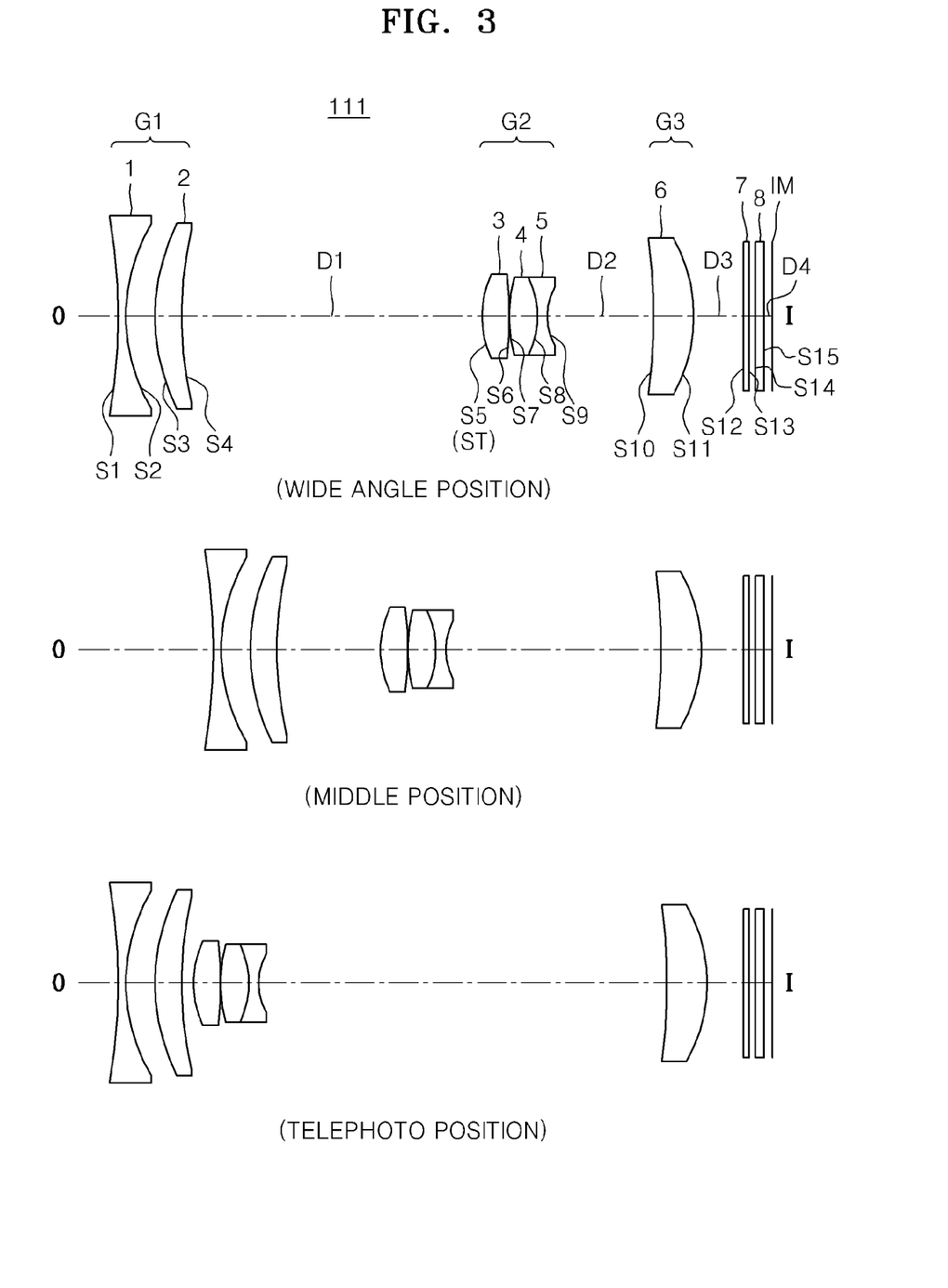
FIG. 3 illustrates optical arrangements of a zoom lens at a wide angle position, at a middle position, and at a telephoto position, according to another embodiment of the invention.

FIG. 3 illustrates optical arrangements of a zoom lens at a wide angle position, at a middle position, and at a telephoto position, according to Embodiment 2. Design data of Embodiment 2 is as follows.

f; 5.61~11.77~23.54  Fno; 2.99~4.30~6.86  2ω; 69.31~36.44~18.69

|        | R         | Dn       | Nd       | Vd      |
|--------|-----------|----------|----------|---------|
| OBJ:   | INFINITY  | INFINITY |          |         |
| S1:    | −33.53474 | 0.500000 | 1.859893 | 42.2806 |
| S2:    | 9.64318   | 1.553563 |          |         |
| S3:    | 11.16656  | 1.369578 | 1.945945 | 17.9843 |
| S4:    | 20.04491  | D1       |          |         |
| S5(ST):| 6.12608   | 1.330410 | 1.627399 | 60.8824 |
| ASP:   |           |          |          |         |

K: −0.380267
A: 0.643689E−04 B: −0.461566E−05 C: −0.864873E−06
D: −0.109943E−07

| S6:  | −49.85276 | 0.100000 |
|------|-----------|----------|
| ASP: |           |          |

K: 0.000000
A: 0.573911E−03 B: 0.521148E−05 C: 0.000000E+00
D: 0.000000E+00

| S7:  | 9.59653  | 1.456535 | 1.883000 | 40.8054 |
|------|----------|----------|----------|---------|
| S8:  | −5.79506 | 0.586656 | 1.691256 | 31.0410 |
| S9:  | 3.77185  | D2       |          |         |
| S10: | −61.25530| 2.103257 | 1.531200 | 56.5100 |
| ASP: |          |          |          |         |

K: 0.000000
A: 0−.326397E−03 B: −0.469253E−05 C: −0.828253E−06
D: 0.263782E−07

| S11: | −9.13551 | D3 |
|------|----------|----|
| ASP: |          |    |

K: 0.000000
A: 0.688241E−04 B: −0.258255E−04 C: −0.110079E−07
D: 0.131605E−07

| S12: | INFINITY | 0.300000 | 1.516798 | 64.1983 |
| S13: | INFINITY | 0.300000 |          |         |
| S14: | INFINITY | 0.500000 | 1.516798 | 64.1983 |
| S15: | INFINITY | 0.500000 |          |         |
| IM:  | INFINITY |          |          |         |

Data about the variable distances of the zoom lens according to Embodiment 2 during zooming is as follows.

TABLE 2

| Variable distance | Wide angle position | Middle position | Telephoto position |
|---|---|---|---|
| D1 | 16.091 | 5.5791 | 0.61 |
| D2 | 5.6692 | 11.5875 | 21.8725 |
| D3 | 2.6608 | 2.1839 | 1.9 |

Figure 4A:
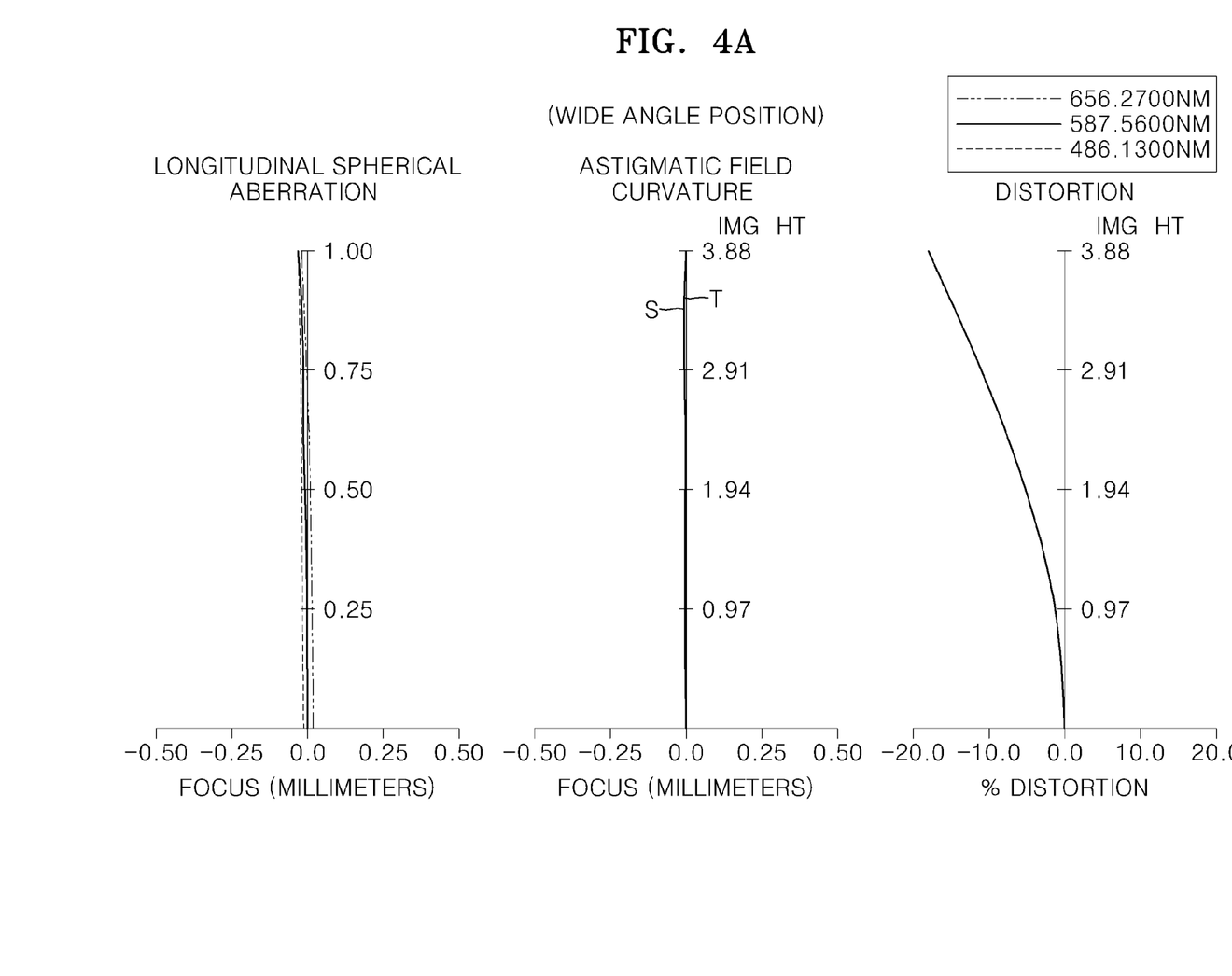
FIGS. 4A and 4B illustrate longitudinal spherical aberration, astigmatism, and distortion of the zoom lens illustrated in FIG. 3, at the wide angle position and at the telephoto position, respectively.
Figure 4B:
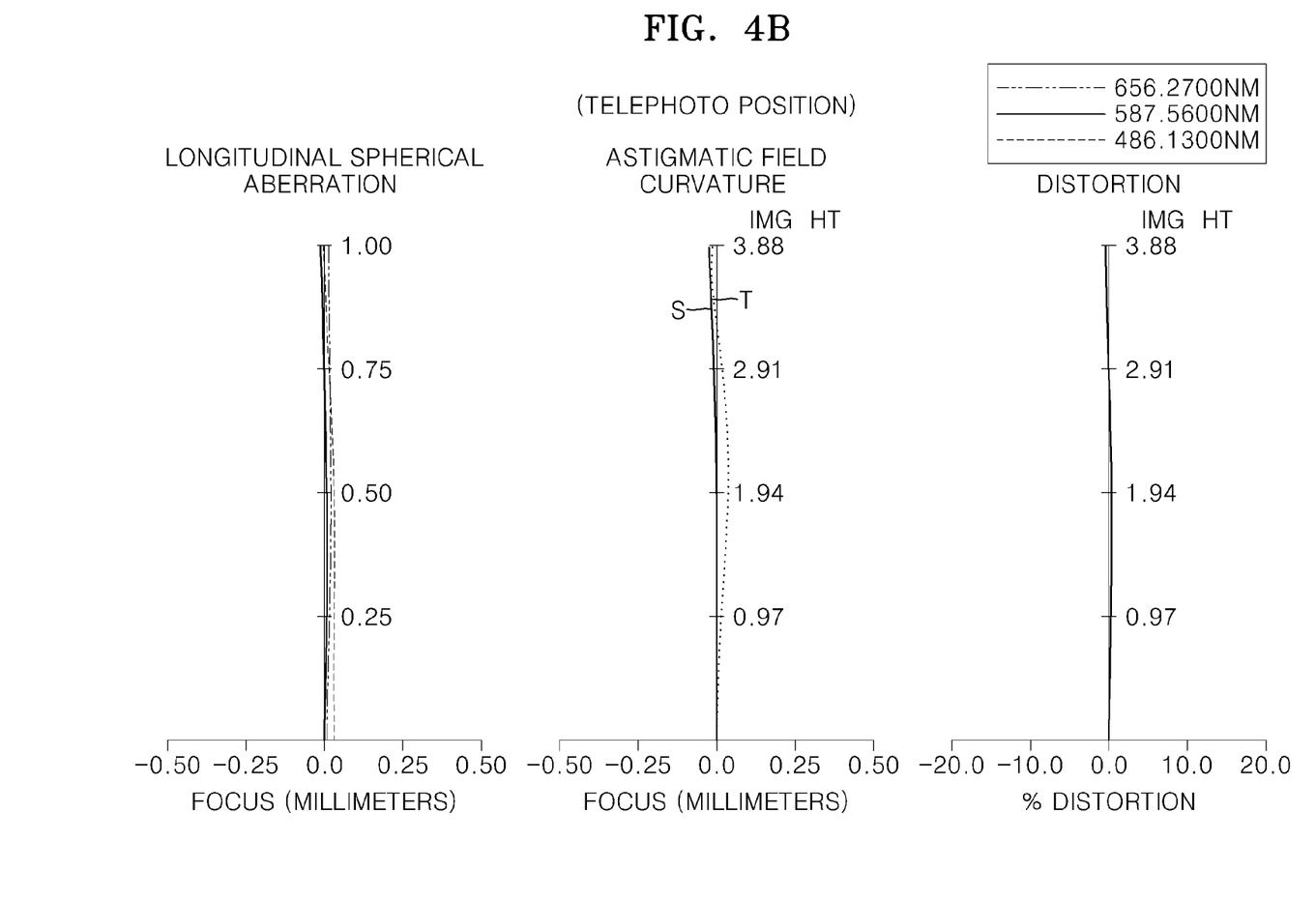

FIGS. 4A and 4B illustrate longitudinal spherical aberration, astigmatic field curvature, and distortion of the zoom lens according to Embodiment 2, at a wide angle position and at a telephoto position, respectively.

<Embodiment 3>

Figure 5:
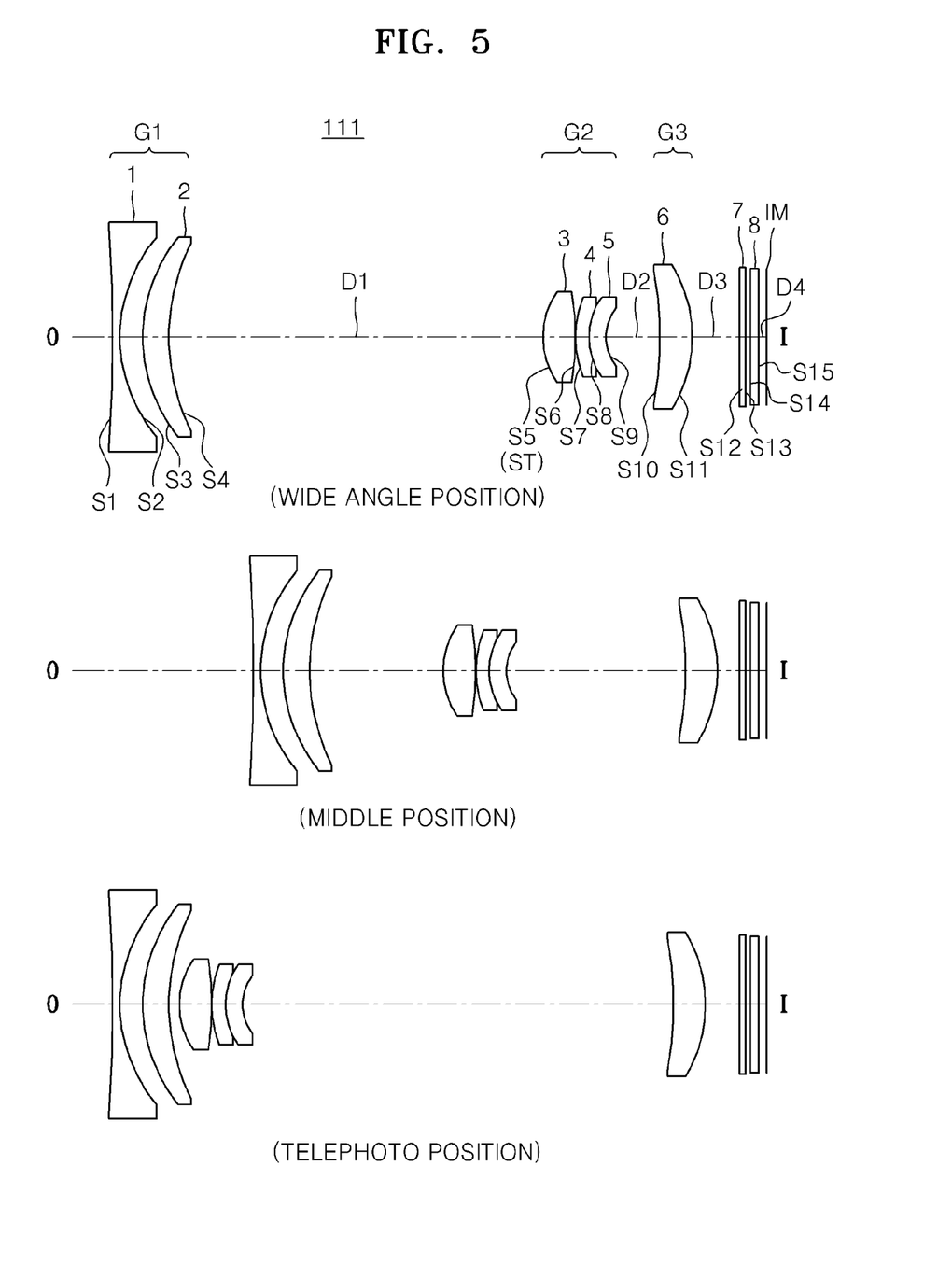
FIG. 5 illustrates optical arrangements of a zoom lens at a wide angle position, at a middle position, and at a telephoto position, according to another embodiment of the invention.

FIG. 5 illustrates optical arrangements of a zoom lens at a wide angle position, at a middle position, and at a telephoto position, according to Embodiment 3. Design data of Embodiment 3 is as follows.

f; 4.40~11.44~29.93  Fno; 2.17~3.62~6.86  2ω; 82.74~37.42~14.76

|         | R          | Dn       | Nd       | Vd      |
|---------|------------|----------|----------|---------|
| OBJ:    | INFINITY   | INFINITY |          |         |
| S1:     | −117.86222 | 0.500000 | 1.891179 | 34.7273 |
| S2:     | 8.83858    | 1.245064 |          |         |
| S3:     | 9.30784    | 1.617056 | 2.1022   | 17.100  |
| S4:     | 13.22762   | D1       |          |         |
| SR(ST): | 4.67814    | 1.754244 | 1.691263 | 55.8848 |
| ASP:    |            |          |          |         |

K: −0.035524
A: 0.338919E−03 B: 0.434412E−06 C: −0.811566E−07 D: 0.335610E−07

| S6:  | −31.34811 | 0.100000 |
|------|-----------|----------|
| ASP: |           |          |

K: 0.000000
A: 0.393331E−03 B: −0.365773E−05 C: 0.000000E+00 D: 0.000000E+00

| S7:  | 7.10330   | 0.754941 | 1.945945 | 17.9843 |
| S8:  | 4.12771   | 1.063344 | 1.569049 | 67.5910 |
| S9:  | 3.02170   | D2       |          |         |
| S10: | −21.55241 | 1.914178 | 1.531200 | 56.5100 |
| ASP: |           |          |          |         |

K: 0.000000
A: 0.468954E−04 B: −.466709E−05 C: −.167162E−06 D: 0.123267E−06

| S11: | −5.89667 | D3 |
|------|----------|----|
| ASP: |          |    |

K: 0.000000
A: 0.673924E−03 B: 0.101178E−03 C: −0.135063E−04 D: 0.521134E−06

| S12: | INFINITY | 0.300000 | 1.516798 | 64.1983 |
| S13: | INFINITY | 0.300000 |          |         |
| S14: | INFINITY | 0.500000 | 1.516798 | 64.1983 |
| S15: | INFINITY | 0.500000 |          |         |
| IM:  | INFINITY |          |          |         |

Data about the variable distances of the zoom lens according to Embodiment 3 during zooming is as follows.

TABLE 3

| Variable distance | Wide angle position | Middle position | Telephoto position |
|---|---|---|---|
| D1 | 21.6662 | 7.5966 | 0.61 |
| D2 | 3.0468 | 10.3646 | 24.9062 |
| D3 | 2.7673 | 1.2426 | 1.9 |

Figure 6A:
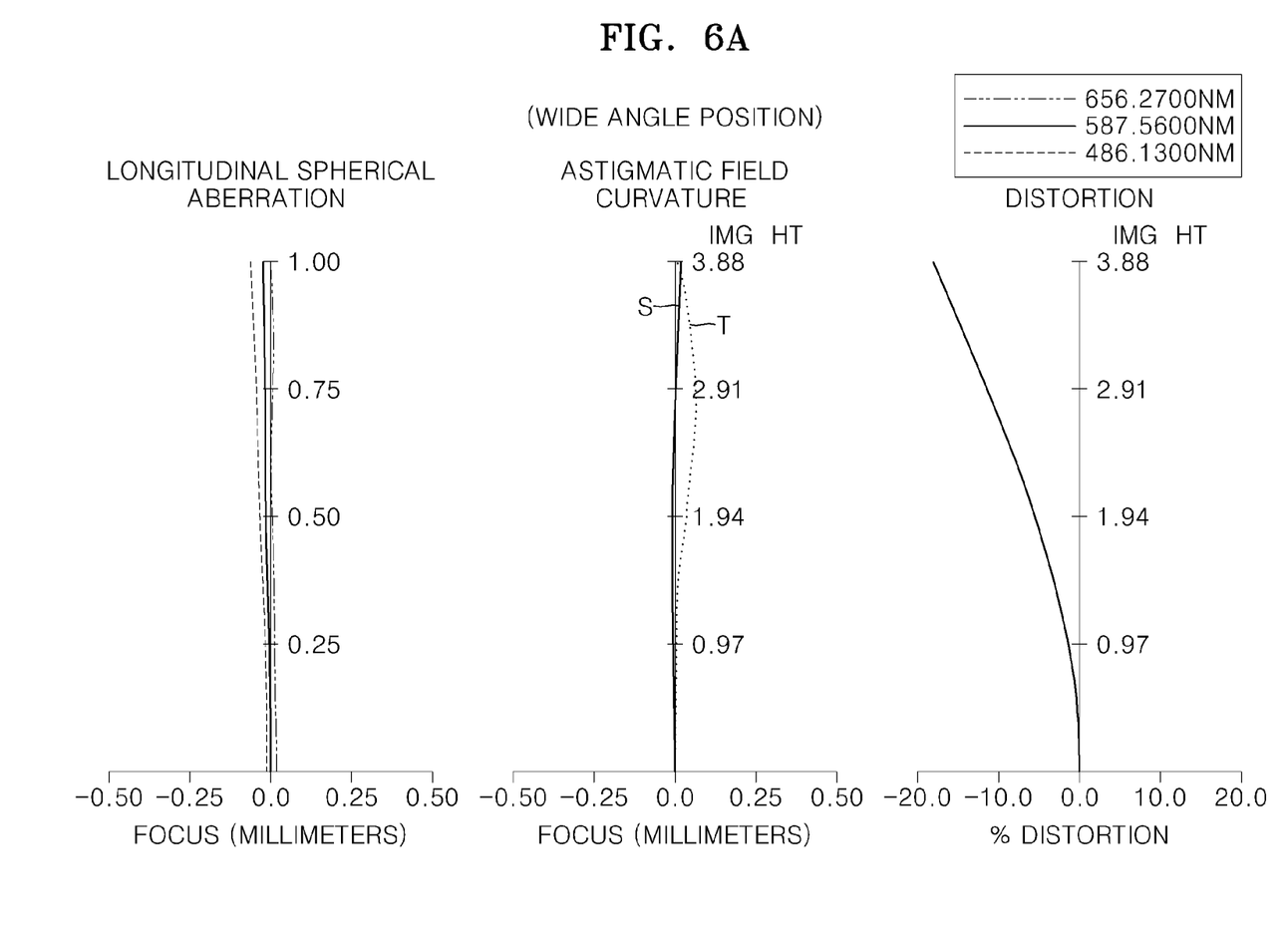
FIGS. 6A and 6B illustrate longitudinal spherical aberration, astigmatic field curvature, and distortion of the zoom lens illustrated in FIG. 5, at the wide angle position and at the telephoto position, respectively.
Figure 6B:
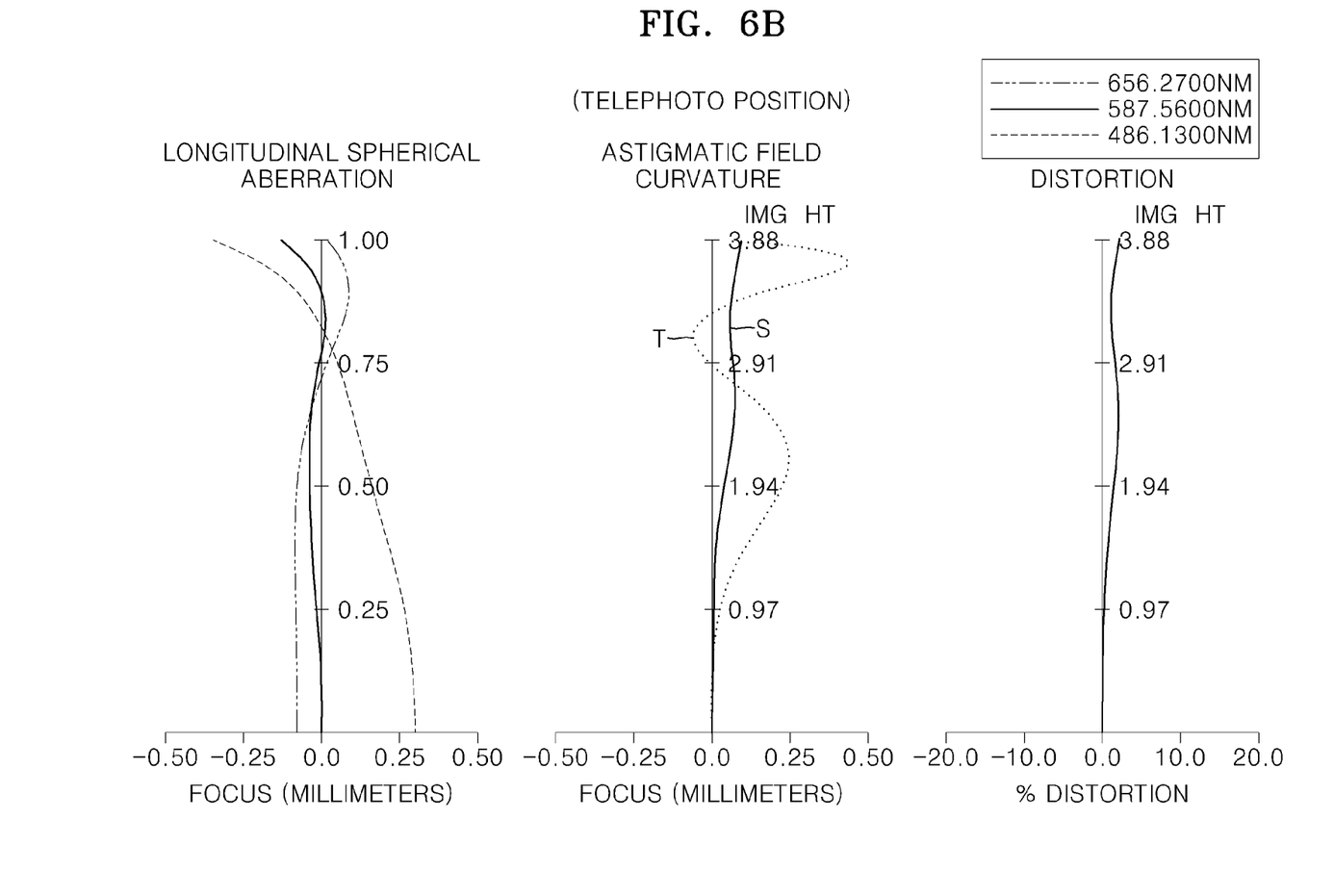

FIGS. 6A and 6B illustrate longitudinal spherical aberration, astigmatic field curvature, and distortion of the zoom lens according to Embodiment 3, at a wide angle position and at a telephoto position, respectively.

Table 10 below shows that each of Embodiments 1-3 satisfies the above-described Expressions 1-4.

TABLE 4

|  | Embodiment 1 | Embodiment 2 | Embodiment 3 |
|---|---|---|---|
| Expression 1 | 4.73 | 4.2 | 6.8 |
| Expression 2 | 0.7629 | 0.6096 | 0.7641 |
| Expression 3 | 0.18773 | 0.17155 | 0.10665 |
| Expression 4 | 1.945945 | 1.945945 | 2.1022 |

A zoom lens according to an embodiment of the invention may have a high zoom magnification and may be manufactured to be compact and at low cost. A zoom lens according to an embodiment of the invention may be applied to photographing devices such as digital still cameras, single-lens reflex cameras, video cameras, and portable terminals that use solid state image pickup devices, such as charge coupled devices (CCDs) or complementary metal-oxide semiconductors (CMOSs).

Figure 7:
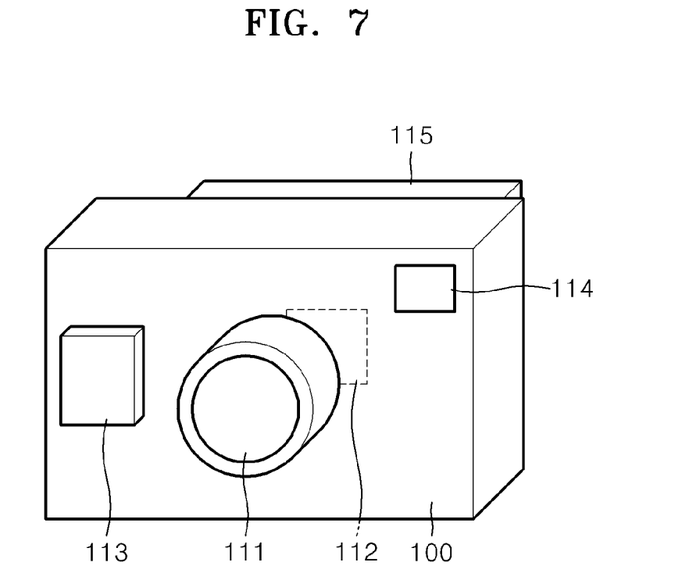
FIG. 7 is a perspective view of a photographing device according to an embodiment of the invention.

FIG. 7 illustrates a photographing device 100 including the zoom lens 111, according to an embodiment of the invention. The photographing device 100 includes the above-described zoom lens 111, and an imaging device 112 for converting light focused by the zoom lens 111 into an electrical image signal. The photographing device 100 may include a recording unit 113 for storing information corresponding to a subject image obtained by photoelectric conversion by using the imaging device 112, and a view finder 114 for observing the subject image. The photographing device 100 may include a display unit 115 on which the subject image is displayed. Although the view finder 114 and the display unit 115 are separately included in the photographing device 100 in FIG. 7, only a display unit may be included in the photographing device 100 without separately including a view finder. The photographing device of FIG. 7 is only an example, and a zoom lens according to an embodiment of the invention may be applied to various optical apparatuses other than cameras. By applying a zoom lens according to an embodiment of the invention to photographing devices such as digital cameras as described above, small and low-priced optical apparatuses having a high magnification can be provided.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:
1. A zoom lens comprising:
a first lens group having a negative refractive power;
a second lens group having a positive refractive power; and
a third lens group having a positive refractive power, which are sequentially arranged in a direction from an object side to an image side,
wherein during zooming from a wide angle position to a telephoto position, the interval between the first lens group and the second lens group decreases, and the interval between the second lens group and the third lens group increases,
the first lens group comprises a first lens, which is biconcave and is closest to the object side, and satisfies the following expressions:

$$4 \le \frac{ft}{fw} \le 7$$

$$\frac{G_1}{fw} \le 0.8$$

where fw and ft denote the focal length of the zoom lens at the wide angle position and the focal length of the zoom lens at the telephoto position, respectively, and $G_1$ denotes the distance between a vertex at the object side and a vertex at the image side along an optical axis in the first lens group.

2. The zoom lens of claim 1, wherein the first lens group further comprises a second lens at the image side of the first lens and satisfies the following expression:

$$\frac{|R_{1-2} - R_{2-1}|}{fw} \le 0.3$$

where $R_{1-2}$ denotes the radius of curvature of the surface of the first lens of the first lens group that faces the image side, and $R_{2-1}$ denotes the radius of curvature of the surface of the second lens of the first lens group that faces the object side, and fw denotes the focal length of the zoom lens at the wide angle position.

3. The zoom lens of claim 1, wherein the first lens group further comprises a second lens at the image side of the first lens and satisfies the following expression:

$$1.9 \le N_2 \le 2.2$$

where $N_2$ denotes the refractive index of the second lens of the first lens group.

4. The zoom lens of claim 1, wherein the first lens is a spherical lens.

5. The zoom lens of claim 1, wherein the first lens is a spherical lens, and the first lens group further comprises a second lens that is a spherical lens, at the image side of the first lens.

6. The zoom lens of claim 5, wherein the second lens is a meniscus lens that is convex toward the object side.

7. The zoom lens of claim 1, wherein the first lens has a refractive index of 1.8 or greater and an Abbe's number of 34 or greater.

8. The zoom lens of claim 1, wherein the second lens group comprises an aspherical lens that is closest to the object side.

9. The zoom lens of claim 1, wherein the second lens group comprises one doublet lens.

10. The zoom lens of claim 9, wherein the doublet lens comprises a positive lens and a negative lens.

11. The zoom lens of claim 1, wherein the third lens group comprises a meniscus lens that is convex toward the image side.

12. The zoom lens of claim 11, wherein the meniscus lens is an aspherical lens.

13. The zoom lens of claim 11, wherein the meniscus lens is formed of plastic.

14. The zoom lens of claim 1, wherein a stop is formed at the object side of the second lens group.

15. The zoom lens of claim 14, wherein the stop moves together with the second lens group during zooming.

16. The zoom lens of claim 1, wherein the third lens group performs focusing.

17. The zoom lens of claim 1, wherein the zoom lens corrects distortion using software.

18. A photographing device comprising:
a zoom lens; and
an imaging device for converting an image obtained by using the zoom lens into an electrical image signal,
wherein the zoom lens comprises:
a first lens group having a negative refractive power;
a second lens group having a positive refractive power; and
a third lens group having a positive refractive power, which are sequentially arranged in a direction from an object side to an image side, wherein during zooming from a wide angle position to a telephoto position, the interval between the first lens group and the second lens group decreases, and the interval between the second lens group and the third lens group increases, the first lens group comprises a first lens, which is biconcave and is closest to the object side, and satisfies the following expressions:

$$4 \leq \frac{ft}{fw} \leq 7,$$

$$\frac{G_1}{fw} \leq 0.8$$

where fw and ft denote the focal length of the zoom lens at the wide angle position and the focal length of the zoom lens at the telephoto position, respectively, and $G_1$ denotes the distance between a vertex at the object side and a vertex at the image side along an optical axis in the first lens group.

* * * * *